(12) United States Patent  
Hayes

(10) Patent No.: US 9,515,908 B2
(45) Date of Patent: Dec. 6, 2016

(54) NETWORK LATENCY TESTING

(71) Applicant: Calix, Inc., Petaluma, CA (US)

(72) Inventor: Timothy Hayes, Santa Barbara, CA (US)

(73) Assignee: Calix, Inc., Petaluma, CA (US)

( * ) Notice: Subject to any disclaimer, the term of this patent is extended or adjusted under 35 U.S.C. 154(b) by 486 days.

(21) Appl. No.: 13/937,406

(22) Filed: Jul. 9, 2013

(65) Prior Publication Data

US 2015/0016278 A1 Jan. 15, 2015

(51) Int. Cl.
H04L 12/26 (2006.01)
H04L 12/24 (2006.01)
H04L 12/42 (2006.01)

(52) U.S. Cl.
CPC .......... *H04L 43/0864* (2013.01); *H04L 12/42* (2013.01); *H04L 41/0803* (2013.01); *H04L 41/12* (2013.01)

(58) Field of Classification Search
CPC ...... H04L 43/0864; H04L 12/42; H04L 41/12; H04L 41/0803
See application file for complete search history.

(56) References Cited

U.S. PATENT DOCUMENTS

| 5,315,580 A | 5/1994 | Phaal |
| 7,054,277 B1 | 5/2006 | Lau et al. |
| 2002/0085683 A1* | 7/2002 | Masri ................ H04L 43/0852 379/27.01 |
| 2005/0207348 A1 | 9/2005 | Tsurumi et al. |
| 2005/0281392 A1* | 12/2005 | Weeks ................ H04L 12/2697 379/22 |
| 2007/0053349 A1 | 3/2007 | Rittmeyer et al. |
| 2007/0071026 A1 | 3/2007 | Rogers |
| 2008/0267069 A1* | 10/2008 | Thielman ................ H04N 7/142 370/235 |
| 2009/0016214 A1 | 1/2009 | Alluisi et al. |
| 2009/0207726 A1 | 8/2009 | Thomson et al. |
| 2010/0265833 A1 | 10/2010 | Ou et al. |
| 2011/0080915 A1 | 4/2011 | Baykal et al. |
| 2011/0099414 A1 | 4/2011 | Santos |
| 2012/0170465 A1 | 7/2012 | Spieser et al. |

(Continued)

FOREIGN PATENT DOCUMENTS

WO WO-2009029303 A1 3/2009

OTHER PUBLICATIONS

"U.S. Appl. No. 13/791,560, Final Office Action mailed Apr. 29, 2015", 21 pgs.

(Continued)

*Primary Examiner* — Thai Nguyen
(74) *Attorney, Agent, or Firm* — Schwegman Lundberg & Woessner, P.A.

(57) ABSTRACT

In general, techniques are described that may allow a network element to analyze the performance of a network without using external equipment external to the network. In one example, a method includes injecting a plurality of data units onto the network, forwarding the plurality of data units around the network loop, injecting at least one timing data unit on to the network, forwarding the at least one timing data unit around the network loop, and determining at least one latency statistic correlated to the at least one characteristic of the forwarded plurality of data units.

17 Claims, 5 Drawing Sheets

(56) References Cited

U.S. PATENT DOCUMENTS

2014/0153406 A1* 6/2014 Brolin .................. H04L 43/50
370/241.1
2014/0254394 A1 9/2014 Hayes
2015/0261635 A1 9/2015 Hayes

OTHER PUBLICATIONS

"U.S. Appl. No. 13/791,560, Non Final Office Action mailed Oct. 1, 2014", 24 pgs.
"U.S. Appl. No. 13/791,560, Preliminary Amendment filed Aug. 22, 2013", 10 pgs.
"U.S. Appl. No. 13/791,560, Response filed Dec. 29, 2014 to Non Final Office Action mailed Oct. 1, 2014", 19 pgs.
"Portable High Density Network Performance Analysis, SmartBits 600", Spirent Communications, 2 pgs.
"U.S. Appl. No. 13/791,560, Advisory Action mailed Jul. 27, 2015", 5 pgs.
"U.S. Appl. No. 13/791,560, Advisory Action mailed Aug. 7, 2015", 5 pgs.
"U.S. Appl. No. 13/791,560, Non Final Office Action mailed Dec. 3, 2015", 25 pgs.
"U.S. Appl. No. 13/791,560, Respnse filed Aug. 24, 2015 to Final Office Action mailed Apr. 29, 2015", 15 pgs.
"U.S. Appl. No. 13/791,560, Response filed Jun. 22, 2015 to Final Office Action mailed Apr. 29, 2015", 14 pgs.
"U.S. Appl. No. 14/208,930, Advisory Action mailed Aug. 6, 2015", 4 pgs.
"U.S. Appl. No. 14/208,930, Final Office Action mailed May 8, 2015", 18 pgs.
"U.S. Appl. No. 14/208,930, Non Final Office Action mailed Oct. 1, 2014", 21 pgs.
"U.S. Appl. No. 14/208,930, Non Final Office Action mailed Dec. 7. 2015", 22 pgs.
"U.S. Appl. No. 14/208,930, Response filed Jul. 7, 2015 to Final Office Action mailed May 8, 2015", 9 pgs.
"U.S. Appl. No. 14/208,930, Response filed Aug. 24, 2015 to Final Office Action mailed May 8, 2015", 10 pgs.
"U.S. Appl. No. 14/208,930, Response filed Dec. 29, 2014 to Non Final Office Action mailed Oct. 1, 2014", 15 pgs.
U.S. Appl. No. 13/791,560, Final Office Action mailed Jun. 24, 2016, 29 pgs.
U.S. Appl. No. 13/791,560, Response filed Mar. 31, 2016 to Non Final Office Action mailed Dec. 3, 2015, 12 pgs.
U.S. Appl. No. 14/208,930, Examiner Interview Summary mailed Mar. 10, 2016, 3 pgs.
U.S. Appl. No. 14/208,930, Final Office Action mailed Jun. 24, 2016, 24 pgs.
U.S. Appl. No. 14/208,930, Response filed Mar. 31, 2016 to Non Final Office Action mailed Dec. 7, 2015, 11 pgs.

* cited by examiner

NETWORK LATENCY TESTING

TECHNICAL FIELD

The disclosure generally relates to computer networks and, more particularly, to network performance analysis techniques.

BACKGROUND

A computer network is a collection of interconnected computing devices that may exchange data and share resources. Often, in highly populated areas, the computer network is configured in a ring formation, where certain devices, such as layer 2 devices, e.g., a switch, are interconnected via network links in a ring. That is, each layer 2 device couples via a separate network link to two adjacent layer 2 devices, one clockwise and the other counterclockwise around the ring. When arranged in a ring, a network, e.g., an optical fiber network, a copper network, or a combination of both, is referred to as a "ring network."

SUMMARY

In general, this disclosure describes techniques that may allow a network element to analyze the performance of a network, e.g., a ring network, or a network segment on the network without using any external equipment, e.g., a portable network performance analysis device, in order to identify potentially problematic traffic patterns before a service provider builds out the network, for example. Analyzing traffic patterns before building out a network may help a service provider to determine whether they should upgrade equipment, reconfiguring existing equipment, and/or reconfigure portions of the network, for example, in order to be able to deliver services that are not impacted by these particular traffic patterns.

Using various techniques described in this disclosure, a network element may inject data units into a loop configured on a network, e.g., an Ethernet ring network, to create a traffic pattern, inject timing data units into the loop, and determine, using the injected timing data units, one or more latency statistics as a function of the traffic patterns. These techniques may provide a mechanism whereby the network operator does not need a technician with any external equipment to analyze the performance of a network or network segment. Instead, a network element may autonomously analyze a network or network segment before network buildout, for example.

In one example, this disclosure is directed to a method that comprises configuring a network loop on a network having at least two network elements, forwarding, using each of the at least two network elements on the network, a plurality of data units around the network loop at a first rate, wherein each of the plurality of data units comprises at least one characteristic, injecting, using a first one of the at least two network elements on the network, at least one timing data unit on to the network, forwarding, using each of the at least two network elements on the network, the at least one timing data unit around the network loop, and determining, based on the at least one timing data unit, at least one latency statistic correlated to the at least one characteristic of the forwarded plurality of data units.

In another example, this disclosure is directed to a network element comprising a control unit configured to configure a network loop on a network having at least two network elements, forward, using each of the at least two network elements on the network, the plurality of data units around the network loop at a first rate, wherein each of the plurality of data units comprises at least one characteristic, inject, using a first one of the at least two network elements on the network, at least one timing data unit on to the network, forward, using each of the at least two network elements on the network, the at least one timing data unit around the network loop, and determine, based on the at least one timing data unit, at least one latency statistic correlated to the at least one characteristic of the forwarded plurality of data units.

In another example, this disclosure is directed to a computer-readable medium containing instructions. The instructions cause a processor to configure a network loop on a network having at least two network elements, forward, using each of the at least two network elements on the network, the plurality of data units around the network loop at a first rate, wherein each of the plurality of data units comprises at least one characteristic, inject, using the first one of the at least two network elements on the network, at least one timing data unit on to the network, forward, using each of the at least two network elements on the network, the at least one timing data unit around the network loop, and determine, based on the at least one timing data unit, at least one latency statistic correlated to the at least one characteristic of the forwarded plurality of data units.

The details of one or more aspects of the disclosure are set forth in the accompanying drawings and the description below. Other features, objects, and advantages will be apparent from the description and drawings, and from the claims.

DETAILED DESCRIPTION

Figure 1:
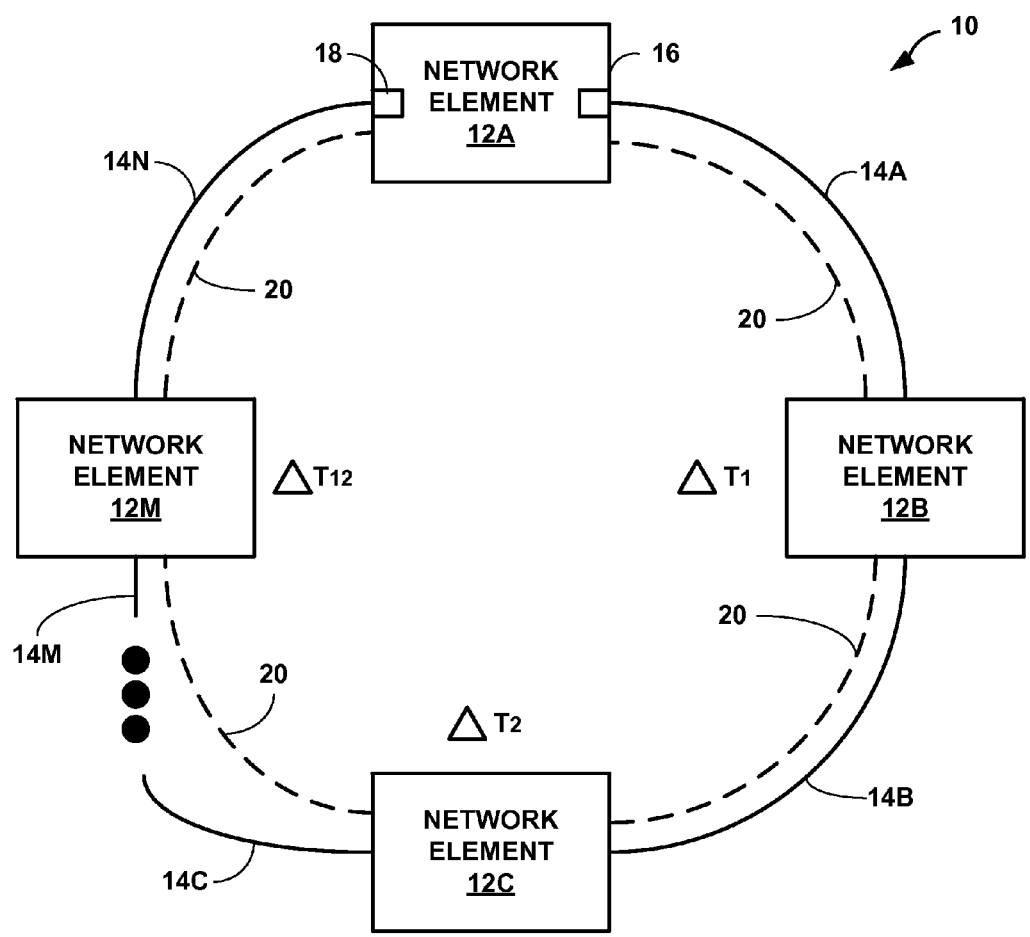
FIG. 1 is a block diagram illustrating an example ring network that may implement various techniques described in this disclosure.

Ring topologies, e.g., Ethernet ring topologies, are commonly used in networks as they require less optical fiber or copper for connectivity and provide an effective topology for creating a loop-free, layer 2 network with good convergence times. Ring topologies include a number of network elements (or "nodes") connected such that each network element is connected to two other network elements, thereby forming a ring configuration. Ring topologies require a network element to be configured as a control node to block traffic in order to prevent a traffic loop around the ring network.

For certain types of data that do not include a specific destination, such as multicast or broadcast data, for example, each of the network elements in the ring network may simply forward this data around the ring to ensure that each network element forwards the data to every network element.

As network usage increases, network performance may degrade as hosts and network elements compete for shared resources. For example, packets transmitted by various hosts may contend for use of a network link. As the packets are received by a network element, the packets may be placed in a queue before the network element may transmit them over the link. As more packets are placed in the queue, the time delay, e.g., latency, through the network element and thus through the network, increases. In an extreme scenario, the number of packets received at a network element may overrun the queue, which may result in the network element dropping packets.

In order to resolve network performance issues resulting from increased usage, for example, service providers may consider building out a network to increase capacity. Building out a network, however, may be an expensive undertaking that involves significant capital expenditures. Hence, it may be desirable for a service provider to analyze the performance of the network in order to determine whether there any particular loads, e.g., traffic patterns, that are degrading the performance of the network, for example. If one or more loads, e.g., traffic patterns, are identified as sources for the degraded network performance, the service provider may be able to upgrade or reconfigure equipment on the network, or reconfigure portions of the network, in order to resolve the network performance. In this manner, major capital expenditures incurred by building out the network may be deferred.

Typically, analyzing a network's performance may involve injecting data units onto the network and gathering statistics, e.g., latency statistics. Such a network performance analysis, however, is ordinarily a manual process and may require external equipment, e.g., a portable network performance analysis device.

Manually performing a network performance analysis, however, may suffer from one or more disadvantages. For example, a network technician may need to travel to one or more of the network elements on the network. In addition, test equipment external to the network, e.g., a network performance analyzer, may be needed to inject data units to test the network. Also, in order to inject data units using the network element, an extra port on the network element may be needed. Finally, if a problem is found following the manual testing, it may be difficult to determine if the problem is on the network or if there is a problem with the port or the test equipment. In general, this disclosure describes techniques that may allow a network element to analyze the performance of a network, e.g., a ring network, a network segment on a network, or a network element itself without using any external equipment, e.g., a portable network performance analysis device, prior to network buildout for example.

FIG. 1 is a block diagram illustrating an example network, e.g., an Ethernet network, configured to perform a network latency test using various techniques described in this disclosure. As shown in FIG. 1, the simplified ring network 10 includes network elements 12A-12M ("network elements 12") and links 14A-14N ("links 14"). In one example, the network elements may include the Calix E7-2 Ethernet Service Access Platform. The network elements 12 may be coupled via respective links 14 to form a ring topology. For example, the network element 12A may be coupled to the network element 12B via the link 14A, the network element 12B is coupled to the network element 12C via the link 14B, and so on, completing the ring with the network element 12M coupled to the network element 12A via the link 14N.

In a ring topology, e.g., an Ethernet ring topology, there may be one control node and one or more non-control nodes connected one to another to form a ring. A network operator may designate a network element, e.g., network element 12A, as the control node during creation and deployment of the ring network 10. During normal operation, the control node is responsible for placing a block in the data path of the ring in order to prevent a traffic loop. The control node is also responsible for communicating with non-control nodes, via messaging protocols, on the ring network in order to manage and control ring topology changes.

The network elements 12, e.g., a layer 2 device such as a layer 2 switch, receive and forward traffic from one or more customer devices subtended from the ring network 10 over ring network 10. Each of the network elements 12 may also forward traffic received from other network elements via ring network 10 to one or more customer devices subtended from the ring network 10. For simplicity, any customer devices subtended from the network elements 12 and capable of generating and/or receiving traffic via ring network 10 are not depicted, e.g., personal digital assistants (PDA), workstations, personal computers, laptop computers, television set-top boxes, voice-over-internet protocol (VoIP) telephones, or any other computing devices.

The example ring network 10 may be configured to provide a wide area network (WAN) or a metropolitan area network (MAN). To support a high level of data traffic, the links 14 may comprise optical fiber links to facilitate the rapid transfer of the traffic around ring network 10. However, one or more links 14 may comprise copper wires. In some examples, the ring network 10 may be heterogeneous and comprise both copper and optical media as the links 14. In other examples, the ring network 10 may be homogeneous and comprise only one type of media, e.g., optical fiber or copper, as the links 14.

The ring topology of the ring network 10 may offer geographic coverage and resilience. That is, the ring network 10 may reach customer devices dispersed over wide geographic areas. The ring network 10 may provide resilience because traffic may be forwarded in both a clockwise direction and counterclockwise direction around the ring network 10. By enabling both directions of forwarding, the network elements 12 may forward traffic so as to avoid one of links 14 that has failed, while still reaching every one of the network elements 12.

The network element 12A, acting as a control node, may include a primary port 16 and a secondary port 18. In one implementation, the control node 12A forwards traffic via the primary port 16 and blocks traffic via the secondary port 18 during normal operation in order to correct for traffic loops. A traffic loop may substantially impact the performance of the ring network by needlessly consuming network resources, such as switch processing time and memory as well as link bandwidth. Traffic that is blocked at the secondary port 18 may be discarded so that it is not forwarded through the loop again. Typically, the control node 12A logically blocks the secondary port 18. In other words, the control node 12A may actively filter traffic arriving via the secondary port 18, discarding or dropping certain traffic, such as data traffic, but allowing other traffic, such as control traffic used by the control node 12A to monitor or otherwise control the ring network 10. By blocking traffic arriving via the secondary port 18 in this manner, the control node 12A ensures that data traffic does not continually loop through the ring network 10 during normal operation, while preserving the beneficial aspects of wide geographical coverage and resilience associated with the ring network.

Upon detecting a fault in the link 14A, for example, a control node, e.g., the network element 12A, may forward traffic via the link 14N counterclockwise around the ring network 10 to reach the network element 12B. The network element 12B may, to avoid faulted the link 14A, simultaneously forward traffic via the link 14B clockwise around the ring network 10 to reach the control node, e.g., the network element 12A. The ring network 10 therefore may support simultaneous forwarding of traffic in both the clockwise and counterclockwise directions to avoid the faulted link. Consequently, the ring network 10 may not only provide wide geographical coverage but resilience as well.

Analyzing the performance of a network, e.g., the ring network 10, may help to determine whether there are particular loads, e.g., traffic patterns, that are problematic for the network. As mentioned above, a network operator typically needs a technician to travel to one or more of the network elements 12 on the network 10 in order to inject data units to test the network 10. For instance, a network operator may need a technician to travel to the location of the network element 12A and inject test data units onto the ring network 10 through an available port on the network element 12A via a network performance analyzer. Then, the technician may need to travel to adjacent network element 12B and perform measurements related to the injected data units. In this manner, the technician may test the network elements 12A, 12B and their connecting link 14A.

In accordance with this disclosure and as will be described in more detail below, a network element, e.g., network element 12A, may inject data units on the ring network 10, e.g., an Ethernet network, and create a large traffic stream such that the network's performance, e.g., latency, may be analyzed with respect to the injected data units. These techniques may provide a mechanism whereby the network operator does not need a technician with any external equipment to analyze the performance of a network or network segment, e.g., link 14A. Instead, a network element, e.g., network element 12A, may autonomously analyze a network or network segment. As used in this disclosure, a "data unit" may include packets, frames, blocks, cells, segments, or any other unit of data, depending on the type of network.

In one example implementation, a VLAN may be configured onto the network 10. Regarding configuring the VLAN on the ring network 10, in some examples, each network element, e.g., network element 12A-12M, configures a virtual local area network (VLAN) 20 that extends around the ring network 10. The VLAN configuration may be accomplished either automatically or manually, e.g., via a network operator manually creating a VLAN on each network element.

In contrast to normal ring network operation, where traffic loops are undesirable, various techniques of this disclosure utilize a traffic loop to continually forward data units around the ring network 10. In some examples, the data units may be forwarded around the ring network 10 at media speed, e.g., the speed of the optical fiber or the speed of the copper, until the loop is broken. To that end, the control node of the ring network, e.g., the network element 12A, may unblock the secondary port 18 to configure a traffic loop in the ring network 10 on the VLAN 20.

Once the loop has been created in the ring network 10, the control node, e.g., network element 12A, may begin generating and injecting a plurality of data units, e.g., a test traffic pattern or test load, onto the ring network 10 without manual intervention by a network operator. Then, the control node, e.g., network element 12A may inject one or more timing data units, e.g., a Precision Timing Protocol (PTP) packet onto the ring network 10, which are forwarded around the ring network 10 by the network elements 12. While the data units of the test traffic pattern are forwarded around the ring network 10 on the VLAN 20, each one of network elements 12 may gather one or more latency statistics, based on the timing data units, that are correlated to the test traffic pattern. Example latency statistics include the cumulative latency of the network and/or the individual latencies of one or more network elements.

Next, a remotely located computing device and/or one or more of the network elements 12, e.g., the control node 12A, may determine one or more latency statistics such that one or more timing degradation profiles as a function of traffic patterns may be determined. In this manner, a network element may autonomously analyze the performance of a network, network segment, and/or network element. In some examples, the control node, e.g., network element 12A, may terminate the traffic loop, e.g., by blocking the secondary port 18, prior to determining the latency statistics.

Although the ring network 10 of FIG. 1 depicts at least four network elements 12, the techniques of this disclosure are not limited to such networks. Rather, the techniques of this disclosure may be used to analyze the performance of two network elements 12, as described in more detail below with respect to FIG. 5. In addition, the techniques of this disclosure may also be used to validate a network subtended from the main network 10, as described in more detail below with respect to FIG. 6.

In some example configurations, a large traffic stream may be created on the network 10 using loop configurations, as described below with respect to FIGS. 2-3.

Figure 2:
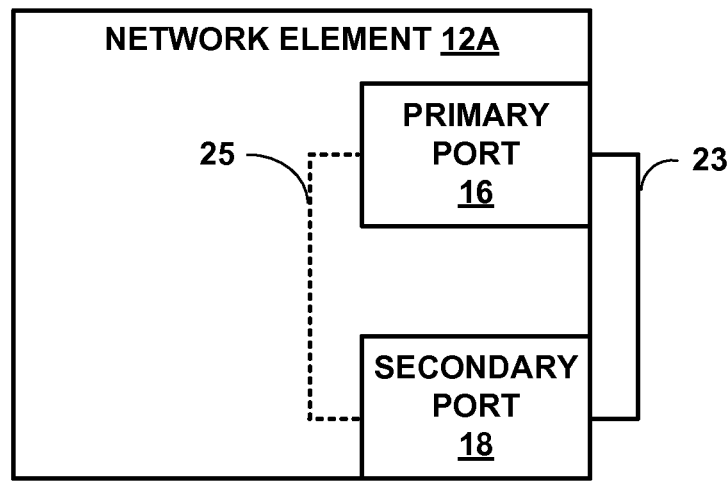
FIG. 2 is a block diagram illustrating a local loop configuration that can be used to implement various techniques of this disclosure.

FIG. 2 is a block diagram illustrating a local loop configuration that can be used to implement various techniques of this disclosure. In FIG. 2, two unused ports, e.g., on the network element 12A, may be wired together to create a virtual local area network (VLAN) loop that is local to the network element. More particularly, a cable 23 can connect the primary port 16 to the secondary port 18, and a VLAN 25 can be configured on the primary port 16 and the secondary port 18. The network element 12A can generate and inject the traffic on either or both the primary and secondary ports 16, 18, which results in media saturation of the link 23 between the primary and secondary ports 16, 18. The traffic can be then injected onto the ring network 10 by, for example, enabling the VLAN 25 on a third port (not depicted) on network element 12A. In another example, the network element 12A can mirror the traffic on the secondary port 18 and transmit a copy of the traffic out a third port (not depicted) on the network element 12A and onto the ring network 10.

Figure 3:
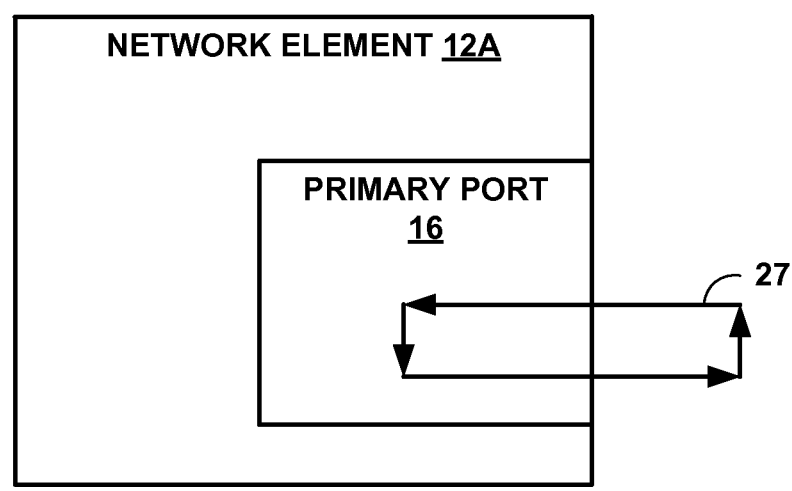
FIG. 3 is a block diagram illustrating a loop-back mode configuration that can be used to implement various techniques of this disclosure.

FIG. 3 is a block diagram illustrating a loop-back mode configuration that can be used to implement various techniques of this disclosure. In FIG. 3, one unused port, e.g., on the network element 12A, may be put in a loop-back mode. For example, the primary port 16 can be placed in either an internal or external loop-back mode. The network element 12A can generate and inject traffic out the primary port 16. The primary port 16 is configured to copy all ingress traffic to a mirror port, which is the primary port 16. Thus, the primary port 16 reflects all ingress traffic because of the mirror operation and the primary port reflects all egress traffic because of the loop-back mode, as represented at reference number 27 in FIG. 3. The traffic can be then injected onto the ring network 10 by, for example, mirroring the traffic on the primary port 18 and transmitting a copy of the traffic out another port, e.g., a secondary port, on the network element 12A and onto the ring network 10. This configuration can create a similar effect as the VLAN loop of FIG. 1.

Figure 4:
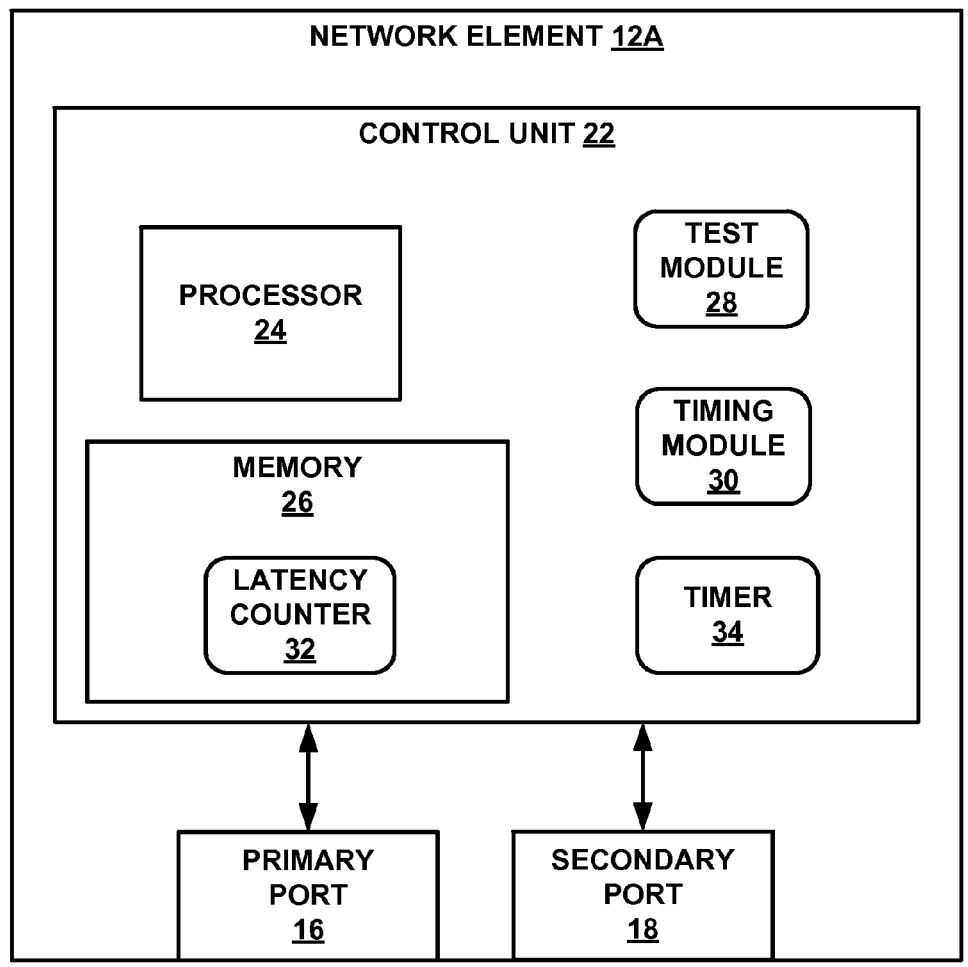
FIG. 4 is a block diagram illustrating an example of a network element on the ring network of FIG. 1 that may implement various techniques described in this disclosure.

The loop-back mode of FIG. 3 can be either physical or logical. For example, using a loop-back plug or by connecting the transmit fiber to the receive fiber can physically create a loop-back mode. Alternatively, the Media Access Control (MAC) layer and/or the Physical Layer (PHY) of the network element can logically support a loop-back mode, FIG. 4 is a block diagram illustrating, in more detail, an example of the network element 12A shown in FIG. 1 that may implement various techniques described in this disclosure. Although FIG. 4 illustrates the network element 12A, each of network elements 12 may be similarly configured. As shown in FIG. 4, the network element 12A includes the primary port 16 and the secondary port 18, where the primary port 16 interfaces with the link 14N (of FIG. 1) and the secondary port 18 interfaces with the link 14A (of FIG. 1). The primary port 16 and the secondary port 18 are illustrated in this manner merely for exemplary purposes and represent logical designations. That is, currently designated secondary port 18 may be re-designated as a primary port and the primary port 16 may also be re-designated as a secondary port. Although not shown for ease of illustration purposes, the network element 12A may comprise additional ports for receiving additional links 14.

The network element 12A also includes a control unit 22 that couples to the primary port 16 and the secondary port 18. The control unit 22 may comprise one or more processors 24 that execute software instructions, such as those used to define a software or computer program, stored in a computer-readable storage medium such as a memory device 26 (e.g., a Flash memory, random access memory (RAM), or any other type of volatile or non-volatile memory that stores instructions), or a storage device (e.g., a disk drive, or an optical drive). Alternatively, the control unit 22 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

As seen in FIG. 4, the network element 12A may further include a network performance test module 28 (or "test module 28") to implement various techniques of this disclosure. In one example, the test module 28 may autonomously analyze the performance of the network. The test module 28 may cause a control unit of a network element, e.g., network element 12A, to configure a VLAN on a ring network. That is, the test module 28 may configure a VLAN, e.g., VLAN 20 of FIG. 1, on the ports 16, 18 of the network element 12A.

Assuming that the network element 12A is the control node of the ring network 10, the test module 28 of the network elements 12A may also generate and transmit to each of the other network elements 12B-12M of the ring network 10 one or more data units comprising profile information in order to configure the VLAN, e.g., VLAN 20 of FIG. 1, on ports of the network elements 12B-12M. Upon receiving the data units, each of the network elements 12B-12M of the ring network 10 may configure the VLAN 20 and forward the data units to an adjacent network element 12 until the VLAN 20 is configured on all the network elements. In other example implementations, the network operator may manually create the VLAN 20 on the ring network 10.

In some examples, a VLAN need not be used for testing. As indicated above, rather than using a VLAN, a loop-back configuration can be used to generate a traffic stream and inject that stream onto the network.

In order to configure a network loop on the ring network 10, the test module 28 may unblock the secondary port 18. By unblocking the secondary port 18 of the network element 12A, any data units injected onto the ring network 10 may continue to be forwarded around the ring by each of the network elements 12.

Upon configuring the VLAN and the network loop on the ring network 10, the test module 28 may, in some examples, cause the control unit 22 to inject a plurality of data units, e.g., a test traffic pattern or test load, for the network performance testing, onto the ring network 10. In some example implementations, the test module 28 may cause the control unit 22 to generate the plurality of data units, e.g., test traffic pattern or test load. These data units may be considered "artificial" in the sense that they are not traffic patterns existing on the network during normal use or operation.

In other example implementations, the test module 28 may cause the control unit 22 to retrieve the plurality of data units from memory, e.g., the memory 26. For example, various traffic patterns from the ring network 10 and/or another existing network during normal operation may be captured and stored. These traffic patterns may include, for example, video, data, and voice traffic, which have various priorities and packet sizes, VLAN information, and the like. These data units may also be considered "artificial" in the sense that they are not traffic patterns existing on the network during normal use or operation.

The traffic patterns can be stored along with their timestamps. The test module 28 may use the stored timestamps to compute spacing information between the data units of the traffic patterns, e.g., inter-packet gap information. The spacing information can allow the stored traffic patterns to be accurately regenerated, e.g., by the network element 12A, so as to simulate the original traffic patterns. Capturing and recreating these real-world traffic patterns on the ring network 10 may more accurately test the performance of the ring network 10 than generating random traffic patterns.

The injected artificial data units may then be forwarded around the ring network 10 by network elements 12. In some examples, the data units may be forwarded at media speed. Media speed is the maximum load that the medium, e.g., optical fiber or copper, may sustain. Injecting a number of data units into the loop results in media speed forwarding of the injected data units. By way of comparison, optical fiber is generally able to sustain a higher speed of transmission of data units than copper.

In other examples, the control unit 22 of a network element 12 may forward the data units around at another rate, e.g., less than media speed. For example, the test module 28 may establish rate limiting on the configured test VLAN 20. For example, the test module 28 may establish a 10 Megabit loop on the VLAN 20 that is running continuously on a 10 Gigabit ring network 10. In some examples, the control unit 22 may perform traffic shaping techniques in order to rate limit the network during the performance analysis.

The injected plurality of data units comprises one or more characteristics that at least partially define a traffic pattern. Characteristics may include, for example, a size of a data unit, a priority level of a data unit, VLAN information, and a type of data unit. For purposes of this disclosure, a "type" of data unit refers to voice, data, and video, where voice is a first type of data unit, video is a second type of data unit, and data is a third type of data unit.

As one example, a first plurality of data units that includes video data units may represent a first traffic pattern. As another example, a second plurality of data units that includes voice data units may represent a second traffic pattern. As another example, a third plurality of data units that includes a particular VLAN ID may represent a third traffic pattern. As another example, a fourth plurality of data units that includes a particular priority level may represent a fourth traffic pattern. As another example, a fifth plurality of data units that includes a particular VLAN ID may represent a fifth traffic pattern. Network and/or network element latency with respect to each of these characteristics may then be determined and reported.

In some instances, it may be desirable to test the network and/or network element latency using traffic patterns that include two or more characteristics. For example, a sixth plurality of data units that includes voice data units and a priority level may represent a sixth traffic pattern. Other combinations of characteristics are within the scope of this disclosure as would be understood by a person of ordinary skill in the art and, for purposes of conciseness, the combinations of characteristics will not be described in more detail. Network and/or network element latency with respect to these combinations of characteristics may then be determined and reported.

In some example implementations, one or more baseline latency statistics may be determined prior to injecting the plurality of data units onto the network. For example, the cumulative latency of the network and/or the individual latencies of one or more network elements may be determined before a load is applied. Later, one or more of the baseline latencies may be compared to one or more latencies determined under load conditions.

After injecting the plurality of data units onto the network 10, a timing module 30 of the control unit 22, e.g., of the control node, may cause the control unit 22 to generate and inject one or more timing data units, e.g., PTP packets, onto the ring network 10 at the top of the ring, e.g., network element 12A. Each timing data unit may have a field that includes an accumulated time, e.g., a correction field of a PTP packet, as the timing data unit traverses the ring. At the network element originating the timing data unit, e.g., network element 12A, there is zero accumulated time in the field as the timing data unit exits the network element.

As the timing data unit enters a downstream network element, e.g., network element 12B, the processor 24 of the network element may capture a copy of the timing data unit and read the field that includes the accumulated time, e.g., a correction field of a PTP packet. The processor 24 may then store the accumulated time, e.g., latency statistics, in the latency counter 32 of the memory 26.

In this manner, the latency counter 32 may store the delay from the network element 12A (upstream node) to the network element 12B (current node). As mentioned above, the network element 12B received a timing data unit from the network element 12A that had zero accumulated delay.

The processor 24 of the network element 12B may capture and store the timing information that it received from the timing data unit as a function of the characteristics of the traffic pattern in the latency counter 32 for later performance analysis purposes.

As seen in FIG. 4, the control unit 22 may include a timer 34. Just prior to exiting the network element, the processor 24 may retrieve timing information from the timer 34 of network element 12B ($\Delta T_1$ in FIG. 1) and timestamp the timing data unit. The control unit 22 may then forward the updated timing data unit to the next network element on the ring network 10, e.g., network element 12C.

Upon receiving the timing data unit, the next network element on the ring network, e.g., network element 12C, may repeat the process described above. As the network element 12C receives the timing data unit, the processor 24 of network element 12C may capture a copy of the timing data unit, read the field that includes the accumulated time ($\Delta T_1$ in FIG. 1), and store the accumulated time in the latency counter 32 of the memory 26. The processor 24 may store the accumulated time, e.g., latency statistics, as a function of the characteristics of the traffic pattern in the latency counter 32 of the network element 12C for later performance analysis purposes.

Just prior to exiting the network element, the processor 24 of the network element 12C may retrieve timing information from the timer 34 ($\Delta T_2$ in FIG. 1) and update the timing data unit to add the latency contributed by the network element 12C. In this case, the accumulated time is the sum of $\Delta T_1$ (latency caused by network element 12B)+$\Delta T_2$ (latency caused by network element 12C). The control unit 22 may then forward the updated timing data unit to the next network element on the ring network 10, e.g., network element 12D (not depicted).

This process of accumulating time in the field of the timing data unit and forwarding the timing data unit continues until the timing data unit reaches the network element that originated the timing data unit, e.g., the network element 12A. As the network element 12A receives the timing data unit, the processor 24 of network element 12A may capture a copy of the timing data unit and retrieve the timing information. In this case, the sum at network element 12A is ($\Delta T_1 + \Delta T_2 + \ldots + \Delta T_{12}$), or the sum of delays of each network element 12 on the network. This sum is the cumulative latency for the network, e.g., the ring network 10. Network element 12A, the originating network element, may correlate the cumulative latency statistics for the network as a function of packet sizes, rates, priorities, VLAN IDs, and the like.

In order to determine the individual latencies for each respective network element 12 on the network 10, the control unit 22 of the network element 12A may generate and transmit a request. In response, each respective network element 12 may retrieve from their respective latency counter 34 the previously stored latency statistics correlated to one or more characteristics of the forwarded plurality of data units. The control unit 22 of the network element 12A may then subtract the received timing information for each respective network element 12 from the cumulative latency of the network in order to determine the individual latency statistics on each individual network element correlated to the one or more characteristics of the forwarded plurality of data units.

For example, the network element 12C received a timing data unit with $\Delta T_1$ in the correction field, a network element 12D (not depicted in FIG. 1) received a timing data unit with $\Delta T_1 + \Delta T_2$ in the correction field, a network element 12E (not depicted in FIG. 1) received a timing data unit with $\Delta T_1 + \Delta T_2 + \Delta T_3$ in the correction field and so forth until the network element 12M received a timing data unit with $\Delta T_1 + \Delta T_2 + \ldots + \Delta T_{12}$ in the correction field. Each network element is aware of the cumulative delay at egress of an upstream neighbor. That is, each network element 12 is aware of all the previous network element delays, but not its own delay. The control unit 22 of the network element 12A, or a remote device, may determine the actual latency $\Delta T$ for each individual network element arithmetically from the received timing information for each respective network element 12 and the received aggregate latency information.

Once one or more latency statistics have been determined for a first characteristic of the forwarded plurality of data units is determined, one or more latencies with respect to a second characteristic of the forwarded plurality of data units may be determined in a manner similar to that described above.

In this manner, latency statistics with respect to the injected plurality of data units, e.g., a traffic pattern, may be determined for the entire ring network 10 (aggregate delay) and/or for each individual network element 12 (node delay). In this manner, the techniques of this disclosure may allow network performance information to be determined, e.g., latency, as a function of the tested traffic patterns. By analyzing the delay at each point on the network, for example, the network element 12A or another device may identify points of congestion.

In some examples, the rate at which the plurality of data units is forwarded around the network 10 may be adjusted. Then, a network element or remote device may determine, based on the timing data unit(s), one or more latency statistics correlated to the rate.

In one example implementation, the test module 28 may define a priority level for the plurality of data units injected onto the ring network 10 for performance analysis. For example, the test module 28 may assign a lower priority to the plurality of data units used for network validation than that which the control unit 22 assigns to the data units used to communicate with the other network elements in the ring network 10. By assigning a lower priority to the data units used for network validation and a higher priority to communication data units between network elements, the control node 12A may be able to communicate with all the other network elements 12B-12M despite the saturation of the ring network 10 during testing.

It should be noted that the techniques of this disclosure are not limited to any particular ring protocol. As such, the techniques of this disclosure may be implemented using ring protocols that include, but are not limited to, Rapid Ring Protection Protocol, Resilient Ethernet Protocol, IEEE 802.17 Resilient Packet Ring Protocol, and RFC-3619. As one example implementation, the techniques of this disclosure may run in parallel with a ring protection protocol by configuring a VLAN on the ring and a loop on the VLAN in the manner described above.

In some example implementations, the test module 28 sets the timer 34 for a specified time. Once the timer 34 reaches the specified time, the test of the performance of the network and/or network element(s) is complete. In order to break the network loop, the test module 28 may block the secondary port 18 of the network element 12A. By blocking the secondary port 18 of the network element 12A, any data units injected onto the ring network 10 will be prevented from being forwarded around the ring.

As indicated above, in some examples, one of the network elements, e.g., the control node, may determine one or more latency statistics correlated to one or more characteristics of the forwarded plurality of data units of the network and/or one or more network elements on the network based on the one or more timing data units, e.g., PTP packets. In other examples, the network elements may gather the latency information correlated to the one or more characteristics of the forwarded plurality of data units and relay that information to a remote device, e.g., a device that is not part of the ring network 10, to determine one or more latency statistics. For example, the information may be relayed to a network management system (not depicted) that may determine one or more latency statistics.

In this manner, a network element may autonomously analyze the performance of a network, e.g., before network build out. As mentioned above, autonomously analyzing the performance of a network using the techniques described above may advantageously reduce the need for external test equipment and technicians to test the network, and may improve the diagnostics of the network by reducing the number of variables if a problem is found, e.g., a port on a network element or the external test equipment.

Although the performance analysis techniques of this disclosure were described above with respect to a network with at least four network elements, the techniques of this disclosure are not so limited. As shown and described in more detail below with respect to FIG. 5, the techniques of this disclosure may also be applied to two network elements, e.g., the network elements 12A and 12B of FIG. 4.

In another example implementation, one or more latency statistics can be periodically determined during normal operation of the ring network 10. That is, one or more latency statistics can be periodically determined without generating and injecting artificial traffic onto the ring network 10. In such an implementation, while "normal" traffic is traversing the ring network 10 during normal operations, a network element 12, e.g., network element 12A, can periodically inject one or more timing data units on to the ring network 10. Each of the network elements 12 on the ring network 10 can forward the timing data unit(s) around the ring network 12. Based on the timing data unit(s), a network element 12 (or a remotely located computing device) can determine one or more latency statistics in the manner described above.

In some example configurations, a network element 12 or a remotely located computing device can compare the periodically determined latency statistic(s) to a threshold value(s). If the determined latency statistic(s) exceeds the threshold value(s), e.g., by a specified amount, the network element 12 or the remotely located computing device can initiate a threshold crossing alarm to alert an operator of the latency conditions on the ring network 10.

In another example implementation, multiple network elements 12 on a ring network 10 can configure multiple loops on the ring network 10. These multiple network elements 12 can also generate and inject traffic onto the ring network 10 in the manner described in this disclosure.

For example, the network element 12A of FIG. 1 can configure a first loop on the ring network 10 and generate and inject data units onto the first loop that is forwarded around the ring network 10. In addition, the network element 12B of FIG. 1 can configure a second loop on the ring network 10 and generate and inject data units onto the second loop that is forwarded around the ring network 10 at the same time that traffic is being forwarded on the first loop.

In some examples, the network element 12A can inject data units onto the first loop of the ring network 10 in a clockwise direction and the network element 12B can inject data units onto the second loop of the ring network 10 in a counterclockwise direction. Using multiple network elements to create multiple loops to generate and inject data units from different locations and/or different directions on the ring network 10 can, for example, create a higher level of saturation than can be achieved with only a single network element.

Figure 5:
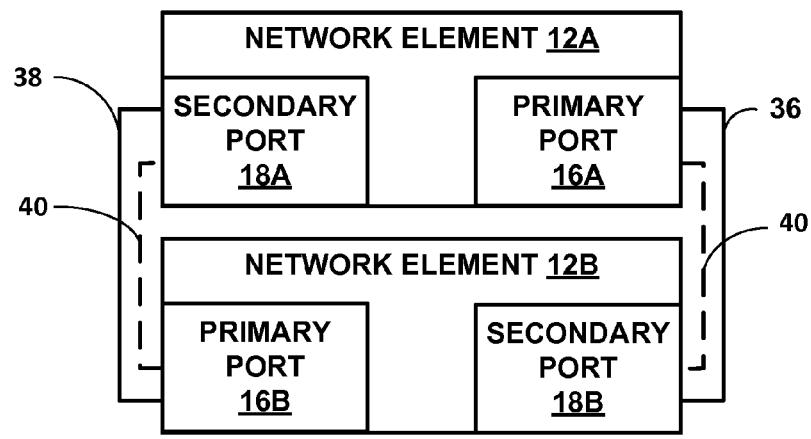
FIG. 5 is a block diagram illustrating the example network elements 12A and 12B of FIG. 4 configured to implement various techniques described in this disclosure.

FIG. 5 is a block diagram illustrating the example network elements 12A and 12B of FIG. 4 configured to implement various techniques described in this disclosure. In FIG. 5, the network elements 12A and 12B are similar to the network element 12A depicted in FIG. 4 and, for purposes of conciseness, will not be described in detail again.

To test two network elements, e.g., the network elements 12A and 12B, a first port is connected to a second port. For example, in FIG. 5, the primary port 16A of network element 12A is connected via a link 36 to the secondary port 18B of network element 12B, and the primary port 16B of network element 12B is connected to the secondary port of network element 12A via a link 38. In some examples, a test module 28 of network element 12A (or network operator) may configure a VLAN, e.g., VLAN 40, on the primary ports 16A, 16B and secondary ports 18A, 18B.

Upon configuring the VLAN, the test module 28 of network element 12A may cause the control unit 22 to generate a plurality of data units for the network performance testing and forward the plurality of data units out the primary port 16A. After injecting the plurality of data units onto the VLAN 40, a timing module 30 of the control unit 22 of the network element 12A, e.g., of the control node, may cause the control unit 22 to generate and inject one or more timing data units, e.g., PTP packets. Each timing data unit may have a field that includes an accumulated time, e.g., a correction field of a PTP packet, as the timing data unit traverses the ring. At the network element originating the timing data unit, e.g., network element 12A, there is zero accumulated time in the field.

As network element 12B receives the timing data unit, e.g., PTP packet, the processor 24 of the network element 12B may capture a copy of the timing data unit and retrieve the timing information. The processor 24 may store the timing information that it received from the timing data unit as a function of the characteristics of the traffic pattern in the latency counter 32 of the network element 12B for later performance analysis purposes.

Just prior to exiting the network element, the processor 24 may retrieve timing information from the timer 34 of network element 12B ($\Delta T_1$) and timestamp the timing data unit. The control unit 22 may then forward the updated timing data unit back to the network element 12A.

As the network element 12A receives the timing data unit, the processor 24 of the network element 12A may capture a copy of the timing data unit and retrieve the timing information of the timing data unit, as described above with respect to FIG. 4.

As mentioned above, in some examples, the test module 28 may set the timer 34 for a specified time. Once the timer 34 reaches the specified time, the network performance is complete. In order to break the network loop, the test module 28 may remove the VLAN 40. In other example configurations, it is also possible to break the network loop using one or more of the following techniques: configuring the VLAN 40 to be in a "blocking" state, configuring a filter to drop the VLAN 40 data units, and placing the port on which the VLAN 40 is configured to drop all data units. In this manner, a network element may autonomously analyze network performance before network build out, for example.

Figure 6:
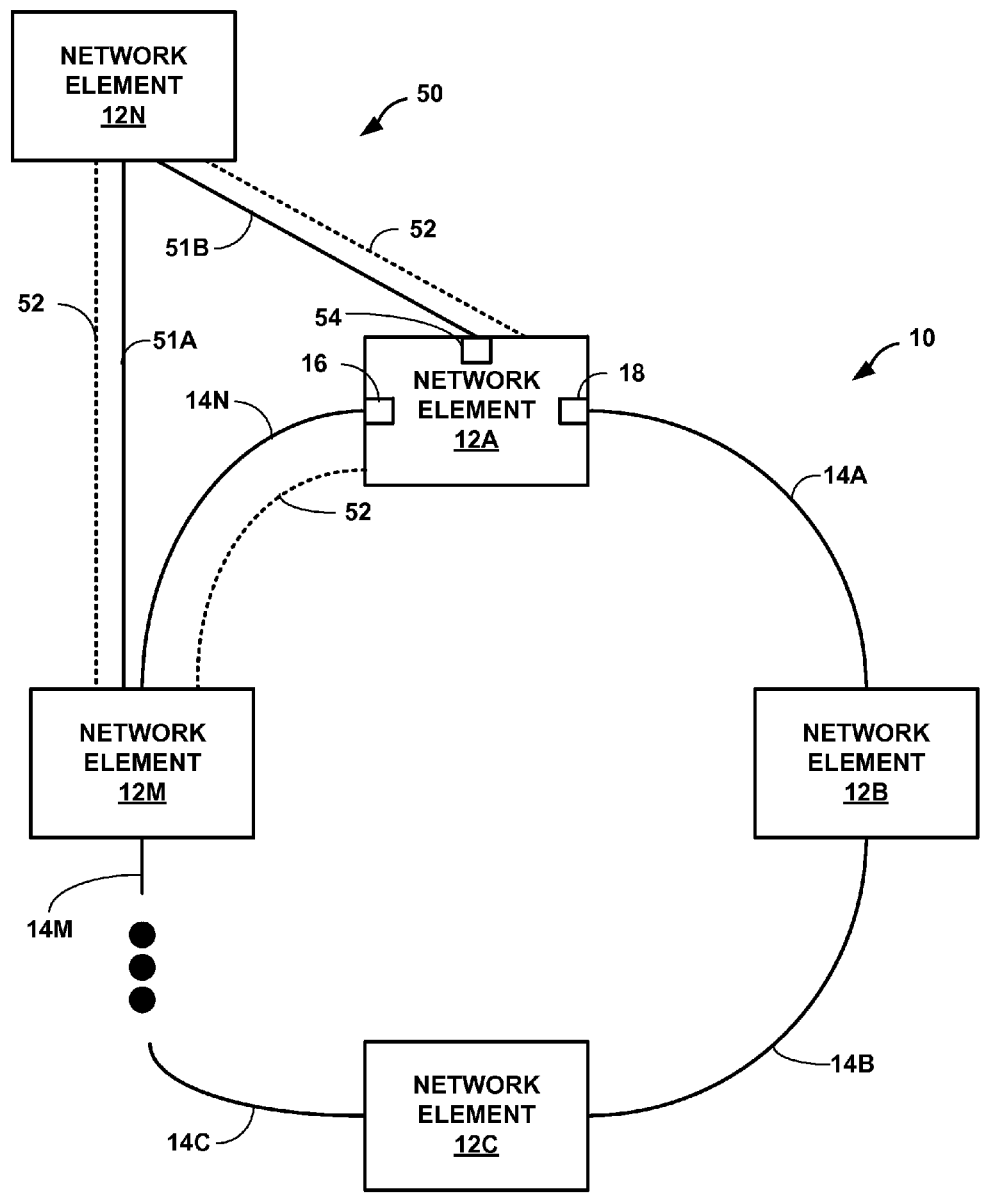
FIG. 6 is a block diagram illustrating an example ring network with a subtended network that may implement various techniques described in this disclosure.

FIG. 6 is a block diagram illustrating an example ring network with a subtended network that may implement various techniques described in this disclosure. More particularly, FIG. 6 depicts a main ring network 10 that includes network elements 12A-12M and a subtended ring network 50 that includes network elements 12A, 12M, and 12N connected by links 14N, 51A, and 51B. In some examples, the main ring network 10 may be an existing, live network and subtended network 50 may be a later-added network that the network operator would like to consider building out, for example.

The performance of either one or both of the network 10 and the subtended network 50, or a portion of either, may be analyzed using the techniques of this disclosure. Analysis of the ring network 10 was described above and, for purposes of conciseness, will not be described in detail again.

The performance of the subtended network 50 may be analyzed in a manner similar to that described above with respect to the ring network 10. In some examples, the network element 12A may act as a control node for both the ring network 10 and the subtended network 50. In other examples, the ring network 10 and the subtended network 50 may each have their own control node, e.g., the network element 12A as the control node for the network 10 and the network element 12N as the control node for the subtended network 50.

Similar to what was described above, a network element, e.g., network element 12A, may inject a plurality of data units and one or more timing data units, e.g., on a virtual local area network (VLAN), configured on the subtended network 50, e.g., an Ethernet network. In this manner, the network element may autonomously analyze the performance of a network or network segment.

In example implementations using a VLAN for testing the subtended network 50, each network element, e.g., network element 12A, 12M, and 12N may configure a VLAN 52 that extends around the subtended network 50. The VLAN configuration may be accomplished either automatically or manually, e.g., via a network operator manually creating a VLAN on each network element. An example method of automatic VLAN configuration was described above and, for purposes of conciseness, will not be described again.

To create a network loop, the control node of the subtended network, e.g., the network element 12A, may unblock the port 54 to configure a loop in the subtended network 50 on the VLAN 52. Once the loop has been created in the subtended network 50, the control node, e.g., network element 12A, may begin generating and injecting a plurality of data units and timing data units onto the subtended network 50 in the manner described above. While the data units and timing data units are forwarded around the subtended network 50 on the VLAN 52, each one of network elements 12A, 12M, and 12N may gather latency information correlated to one or more characteristics of the forwarded data units, e.g., size, type, VLAN ID, priority level, and the like, based on the timing data units.

In some examples, after a period of time, the control node, e.g., network element 12A, may terminate the network loop, e.g., by blocking the port 54. Next, a remotely located computing device and/or one or more of the network elements 12, e.g., the control node 12A, may determine one or more latency statistics correlated to the one or more characteristics of the forwarded plurality of data units based on the one or more timing data units. In this manner, a network element may autonomously analyze the performance of a subtended network before network build out, for example.

In another example implementation, multiple network elements 12 on the ring network 10 and the subtended ring network 50 can configure multiple loops. These multiple network elements 12 can also generate and inject traffic onto the ring network 10 and the subtended ring network 50 in the manner described in this disclosure.

For example, the network element 12A of FIG. 6 can configure a first loop on the ring network 10 and generate and inject traffic onto the first loop that is forwarded around the ring network 10. In addition, the network element 12N of FIG. 6 can configure a second loop on the subtended ring network 50 and generate and inject traffic onto the second loop that is forwarded around the subtended ring network 50 at the same time that traffic is being forwarded on the first loop. In this manner, multiple ring topologies can be tested simultaneously.

Figure 7:
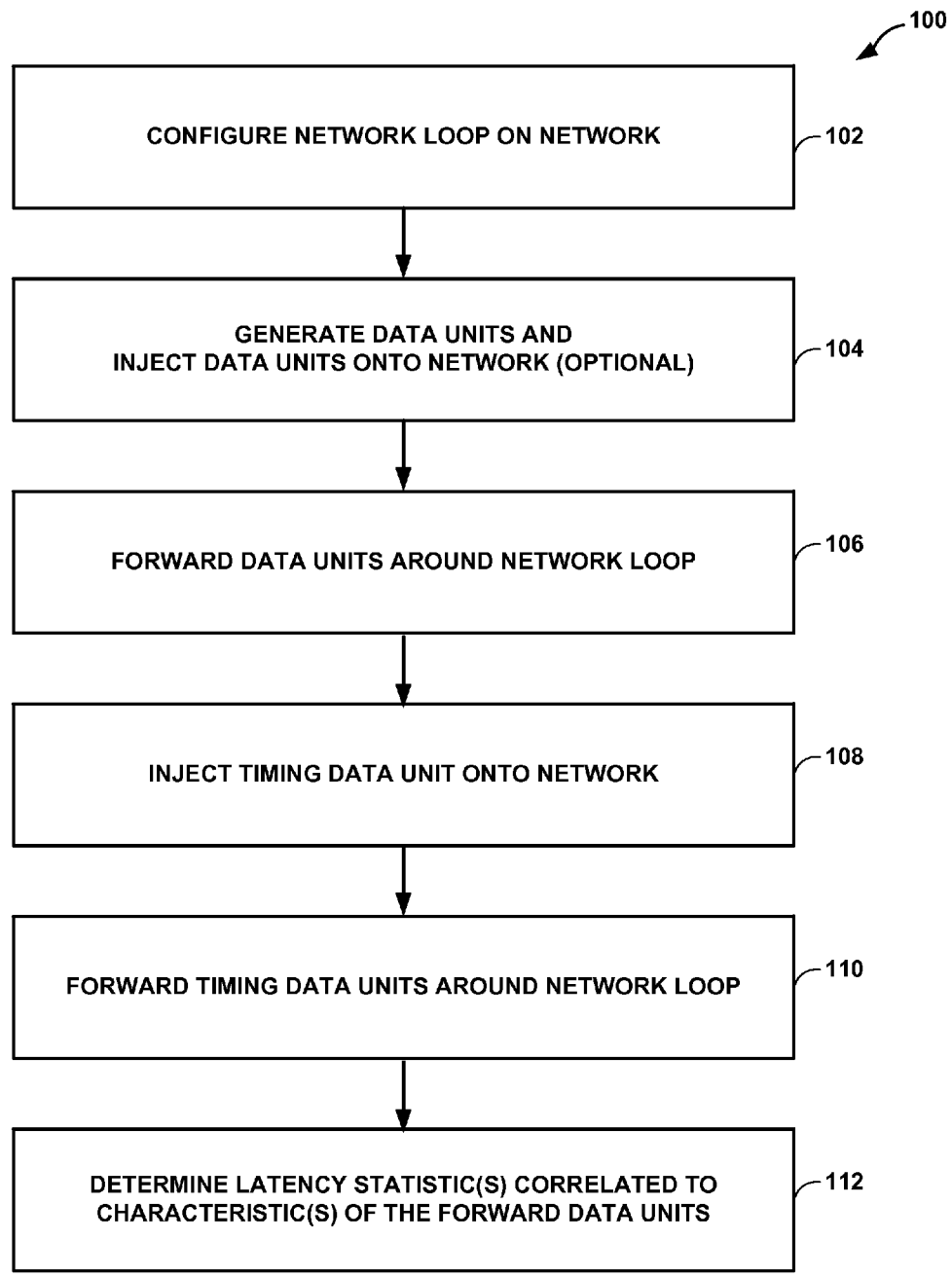
FIG. 7 is a flow chart illustrating an example method of autonomously analyzing the performance of a network or network element using various techniques of this disclosure.

FIG. 7 is a flow chart illustrating an example method of autonomously analyzing the performance of a network or network element using various techniques of this disclosure. In the example method of FIG. 7, shown generally at 100, the test module 28 of the control unit 22 of a network element, e.g., network element 12A, may configure a network loop on a network having at least two network elements (102). In some examples, the test module 28 may optionally generate (or retrieve from memory) a plurality of artificial data units having one or more characteristics, e.g., a size of a data unit, a priority level of a data unit, VLAN information, and a type of data unit, and inject the data units onto a network (104). Whether the plurality of data units are artificially generated (or retrieved from memory) or the result of traffic during normal operations, each of the network elements 12 of the network may forward the data units around the network loop, at a first speed, e.g., media speed (106). The timing module 30 may then cause the control unit 22 to generate and inject one or more timing data units, e.g., PTP packets, onto the ring network 10 at the top of the ring, e.g., network element 12A (108). Each of the network elements 12 of the network may forward the timing data units around the network loop (110).

As described above, each of the network elements and, in particular, the processor 24, may capture a copy of the timing data unit and read the field that includes the accumulated time, e.g., a correction field of a PTP packet. The processor 24 may then store the accumulated time, e.g., in the correction field, in the latency counter 32 of the memory 26 and correlate the time to the one or more characteristics of the data units.

In some examples, one of the network elements, e.g., the control node, may determine one or more latency statistics, e.g., cumulative latency for the network, latency of one or more individual network elements, and the like, that are correlated to one or more characteristics of the forwarded plurality of data based on the one or more timing data units, e.g., PTP packets (112). For example, the control node may determine a cumulative network latency for video packets and individual network element latency for video packets.

In other examples, the network elements may gather the latency information correlated to the one or more characteristics of the forwarded plurality of data units and relay that information to a remote device, e.g., a device that is not part of the ring network 10, to determine one or more latency statistics. For example, the information may be relayed to a network management system (not depicted) that may determine whether there are any network errors.

It should be noted that although the techniques of this disclosure were described above with respect to wired configurations, e.g., optical or copper, the techniques of this disclosure may also be applied to wireless networks.

The techniques described in this disclosure may be implemented, at least in part, in hardware, software, firmware or any combination thereof. For example, various aspects of the described techniques may be implemented within one or more processors, including one or more microprocessors, digital signal processors (DSPs), network processors (NPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate computing hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

What is claimed is:

1. A method comprising:
   configuring a network loop on a network having at least two network elements;
   injecting, using a first one of the at least two network elements on the network, a plurality of data units onto the network, wherein the plurality of data units comprises a first plurality of data units and a second plurality of data units, wherein each of the first plurality of data units comprises a first characteristic and each of the second plurality of data units comprises a second characteristic;
   forwarding, using each of the at least two network elements on the network, the plurality of data units around the network loop at a first rate, wherein each of the plurality of data units comprises at least one characteristic;

injecting, using the first one of the at least two network elements on the network, at least one timing data unit on to the network loop;

forwarding, using each of the at least two network elements on the network, the at least one timing data unit around the network loop; and determining, based on the at least one timing data unit, at least one latency statistic correlated to the at least one characteristic of the forwarded plurality of data units by at least one of the at least two network elements, wherein determining the at least one latency statistic comprises determining a first latency statistic correlated to the first characteristic of the forwarded plurality of data units and a second latency statistic correlated to the second characteristic of the forwarded plurality of data units.

2. The method of claim 1, wherein injecting, using the first one of the at least two network elements on the network, a plurality of data units is performed without using any equipment external to the network.

3. The method of claim 1, further comprising:

determining, prior to injecting the plurality of data units onto the network, at least one baseline latency statistic; and comparing the determined at least one latency statistic correlated to the at least one characteristic of the forwarded plurality of data units to the at least one baseline latency statistic.

4. The method of claim 1, wherein the first rate is media speed.

5. The method of claim 1, further comprising:

adjusting the first rate; and determining, based on the at least one timing data unit, at least one latency statistic correlated to the first adjusted rate.

6. The method of claim 1, wherein the at least one characteristic of each of the plurality of data units is selected from the group consisting of size, type of data unit, and a priority level.

7. The method of claim 1, wherein determining, based on the at least one timing data unit, at least one latency statistic correlated to the at least one characteristic of the forwarded timing data unit comprises:

determining an aggregate latency for the network.

8. The method of claim 1, wherein determining, based on the at least one timing data unit, at least one latency statistic correlated to the at least one characteristic of the forwarded timing data unit comprises:

determining a latency for at least one of the at least two network elements.

9. A network element comprising:

at least one processor; and a memory storing instructions that, when executed by the at least one processor, cause the network element to:

configure a network loop on a network having at least two network elements;

inject a plurality of data units onto the network, wherein the plurality of data units comprises a first plurality of data units and a second plurality of data units, wherein each of the first plurality of data units comprises a first characteristic and each of the second plurality of data units comprises a second characteristic;

forward, the plurality of data units around the network loop at a first rate, wherein each of the plurality of data units comprises at least one characteristic;

inject, at least one timing data unit on to the network loop;

forward, the at least one timing data unit around the network loop; and determine, based on the at least one timing data unit, at least one latency statistic correlated to the at least one characteristic of the forwarded plurality of data units, wherein to determine the at least one latency statistic includes determination of a first latency statistic correlated to the first characteristic of the forwarded plurality of data units and a second latency statistic correlated to the second characteristic of the forwarded plurality of data units.

10. The network element of claim 9, wherein injecting, the plurality of data units is performed without using any equipment external to the network.

11. The network element of claim 9, wherein instructions further cause the network element to:

determine, prior to injecting the plurality of data units onto the network, at least one baseline latency statistic; and compare the determined at least one latency statistic correlated to the at least one characteristic of the forwarded plurality of data units to the at least one baseline latency statistic.

12. The network element of claim 9, wherein the first rate is media speed.

13. The network element of claim 9, wherein instructions further cause the network element to:

adjust the first rate; and determine, based on the at least one timing data unit, at least one latency statistic correlated to the first adjusted rate.

14. The network element of claim 9, wherein the at least one characteristic of each of the plurality of data units is selected from the group consisting of size, type of data unit, and a priority level.

15. The network element of claim 9, wherein the instructions to determine, based on the at least one timing data unit, at least one latency statistic correlated to the at least one characteristic of the forwarded timing data unit includes instructions that further cause the network element to determine an aggregate latency for the network.

16. The network element of claim 9, wherein the instructions to determine, based on the at least one timing data unit, at least one latency statistic correlated to the at least one characteristic of the forwarded timing data unit includes instructions that further cause the network element to:

determine a latency for at least one of the at least two network elements.

17. A non-transitory computer-readable medium comprising instructions encoded on the computer-readable medium that, upon execution, cause a processor to:

configure a network loop on a network having at least two network elements;

inject, a plurality of data units onto the network, wherein the plurality of data units comprises a first plurality of data units and a second plurality of data units, wherein each of the first plurality of data units comprises a first characteristic and each of the second plurality of data units comprises a second characteristic;

forward, the plurality of data units around the network loop at a first rate, wherein each of the plurality of data units comprises at least one characteristic;

inject, at least one timing data unit on to the network loop;

forward, the at least one timing data unit around the network loop; and determine, based on the at least one timing data unit, at least one latency statistic correlated to the at least one characteristic of the forwarded plurality of data units by at least one of the at least two network elements, wherein to determine the at least one latency statistic includes determination of a first latency statistic correlated to the first characteristic of the forwarded plurality of data units and a second latency statistic correlated to the second characteristic of the forwarded plurality of data units.

\* \* \* \* \*